T. P. Crutcher,

Churn Dasher.

No. 98,152. Patented Dec. 21. 1869.

Witnesses.
J. F. Wagner
Wm. B. Shepherd

Inventor.
Theophilus Crutcher

United States Patent Office.

THEOPHILUS CRUTCHER, OF EDGEFIELD, TENNESSEE.

Letters Patent No. 98,152, dated December 21, 1869.

IMPROVEMENT IN CHURN-DASHER.

The Schedule referred to in these Letters Patent and making part of the same.

I, THEOPHILUS CRUTCHER, in the town of Edgefield, county of Davidson, State of Tennessee, have invented certain Improvements in a Churn-Dasher, of which the following is a specification.

Nature and Objects of the Invention.

The first part of my invention relates to the shape of the dasher, with its attachment to the tin tube; the second part relates to the arrangement of the valve between screws by means of which the air is introduced into the milk.

Figure 1:
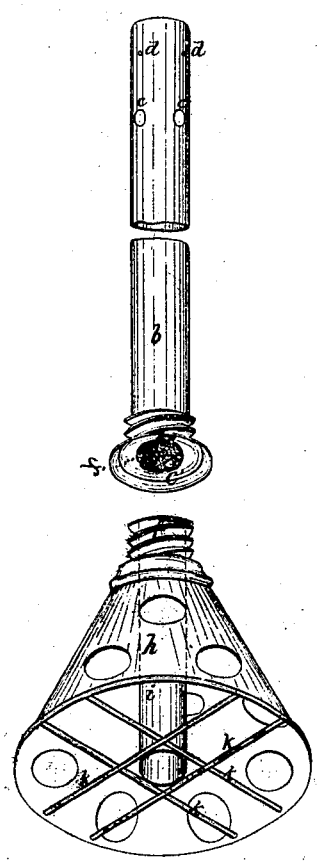
Figure 1, view from the bottom, perspective.
Figure 2:
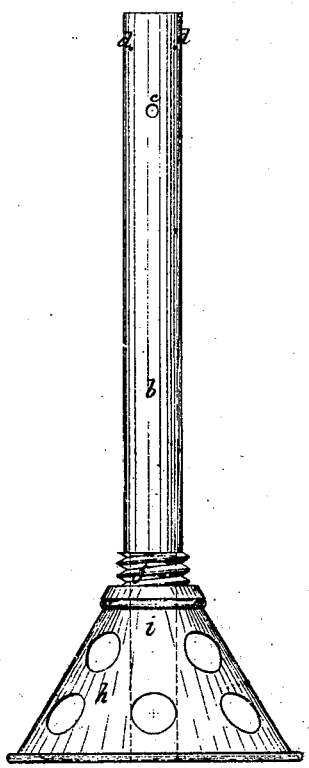
Figure 2, as seen from the front.
Figure 3:
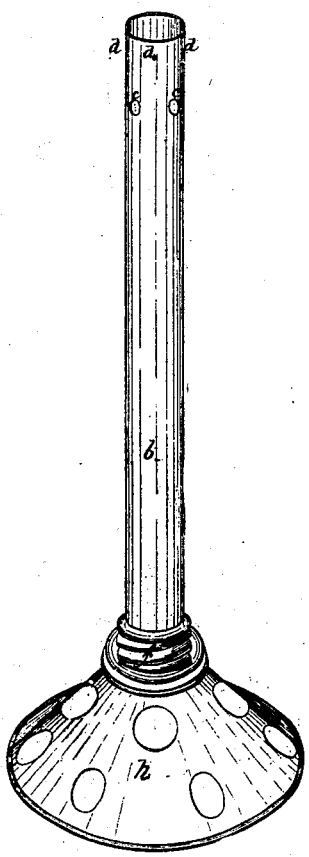
Figure 3, perspective, from the top.
Figure 4:
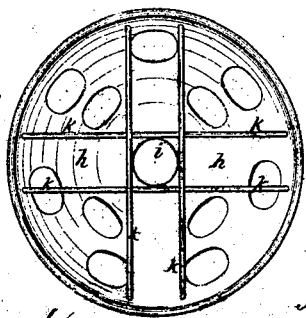
Figure 4, as seen from the bottom.

General Description.

The tin tube B is made with perforated holes near its top, C C C, for the admission of air.

Immediately above are three smaller holes, $d\ d\ d$, which are intended for small screws or tacks to secure a wooden staff, which is designed to lengthen the staff to any desirable length.

To the lower end of said tin tube is affixed a female screw, E, which receives a male screw, F, the screws being designed to enclose the valve $g$.

The dasher $h$ is made of tin, and funnel-shaped, which facilitates its up-and-down movements; it is perforated with holes and attached to the male screw F.

As the dash is being raised, the air from above opens the valve $g$, and admits the air as it is forced downward, the valve closes, which forces the air into the milk, at the same time the milk is thrown in jets through the perforated holes in the dash.

The tube I, which is continued to the lower part of the dash, and secured by the wires K K, is intended to keep the air from escaping when the dash is raised, except through the milk.

I do not claim as my invention the principle of forcing air into the milk by means of a valve; but

What I claim as my improvement, and desire to secure by Letters Patent, is—

The combination of the conical dasher $h$, when provided with perforations, as shown, cross-bars $k\ k\ k\ k$, the tube $i$, hollow shaft $b$, valve-seat $c$, and valve $g$, as herein set forth.

THEOPHILUS CRUTCHER.

Witnesses:
   W. E. BYERS,
   R. I. GOAN.